(12) United States Patent
Wiest et al.

(10) Patent No.: US 9,335,193 B2
(45) Date of Patent: May 10, 2016

(54) ULTRASONIC FLOW MEASURING DEVICE HAVING A CONCAVE REFLECTIVE SURFACE THAT CANCELS DISPERSION AND METHOD FOR ASCERTAINING FLOW VELOCITY, RESPECTIVELY VOLUME FLOW, OF A FLUID

(71) Applicant: Endress + Hauser Flowtec AG, Reinach (CH)

(72) Inventors: Achim Wiest, Weil am Rhein (DE); Sascha Grunwald, Steinen (DE); Andrea Berger, Hasel-Glashutten (DE); Oliver Brumberg, Rheinfelden (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 0 days.

(21) Appl. No.: 14/377,033

(22) PCT Filed: Jan. 29, 2013

(86) PCT No.: PCT/EP2013/051645
§ 371 (c)(1),
(2) Date: Aug. 6, 2014

(87) PCT Pub. No.: WO2013/117457
PCT Pub. Date: Aug. 15, 2013

(65) Prior Publication Data
US 2015/0000422 A1    Jan. 1, 2015

(30) Foreign Application Priority Data

Feb. 10, 2012 (DE) .......................... 10 2012 101 098

(51) Int. Cl.
*G01F 1/66* (2006.01)
(52) U.S. Cl.
CPC ................ *G01F 1/662* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 4,754,650 A * | 7/1988 | Smalling | ................. | G01F 1/662 73/861.28 |
| 5,372,047 A * | 12/1994 | Russwurm | ............. | G01F 1/662 73/861.27 |

(Continued)

FOREIGN PATENT DOCUMENTS

| | | |
|---|---|---|
| DE | 4010148 A1 | 10/1991 |
| DE | 4336370 C1 | 2/1995 |

(Continued)

OTHER PUBLICATIONS

English Translation of the International Preliminary Report on Patentability, WIPO, Geneva, Aug. 21, 2014.

(Continued)

*Primary Examiner* — Harshad R Patel
(74) *Attorney, Agent, or Firm* — Bacon & Thomas, PLLC

(57) ABSTRACT

An ultrasonic flow measurement device for ascertaining flow velocity, respectively volume flow, of a fluid, especially a gas or a liquid, using a travel-time difference method, comprising: a measuring tube having a straight measuring tube axis; at least one transmitter for transmitting an acoustic signal; at least one receiver for receiving the acoustic signal; and at least one reflection surface for reflecting the acoustic signal. The transmitter and the receiver are arranged on the tube wall of the measuring tube in such a manner that they can transmit the acoustic signal inclined or perpendicularly to the flow direction of the fluid, wherein at least one reflection surface is embodied concavely in a preferential direction; and a method for ascertaining flow velocity, respectively volume flow, of a fluid.

17 Claims, 3 Drawing Sheets

(56) References Cited

U.S. PATENT DOCUMENTS

| | | | | |
|---|---|---|---|---|
| 5,461,931 | A * | 10/1995 | Gill | G01F 1/662 73/861.27 |
| 5,650,572 | A * | 7/1997 | Vontz | G01F 1/8662 73/861.27 |
| 5,907,099 | A * | 5/1999 | Huang | G01F 1/662 73/597 |
| 6,345,539 | B1 * | 2/2002 | Rawes | G01F 1/662 73/861.27 |
| 7,287,437 | B2 * | 10/2007 | Kroemer | G01F 1/662 73/861.25 |
| 2004/0129088 | A1 | 7/2004 | Moscaritolo | |
| 2006/0156829 | A1 * | 7/2006 | Konzelmann | G01F 1/662 73/861.27 |
| 2006/0288798 | A1 * | 12/2006 | Kroemer | G01F 1/662 73/861.18 |
| 2007/0261501 | A1 * | 11/2007 | Lang | G01F 1/662 73/861.27 |
| 2009/0178490 | A1 * | 7/2009 | Konzelmann | G01F 1/662 73/861.29 |
| 2014/0144247 | A1 | 5/2014 | Wiest | |

FOREIGN PATENT DOCUMENTS

| | | |
|---|---|---|
| DE | 4336368 A1 | 4/1995 |
| DE | 19549162 A1 | 8/1996 |
| DE | 10120355 A1 | 10/2002 |
| DE | 102006023478 A1 | 11/2007 |
| DE | 102006023479 A1 | 11/2007 |
| DE | 102011079250 A1 | 1/2013 |
| EP | 0392294 A1 | 10/1990 |
| EP | 0650034 A1 | 4/1995 |
| EP | 1096236 A2 | 5/2001 |
| EP | 1439377 A2 | 7/2004 |
| JP | 2000304583 A | 2/2000 |
| WO | 2006063873 A1 | 6/2006 |

OTHER PUBLICATIONS

German Search Report, German PTO, Munich, Sep. 28, 2012.
International Search Report, EPO, The Netherlands, May 14, 2013.

* cited by examiner

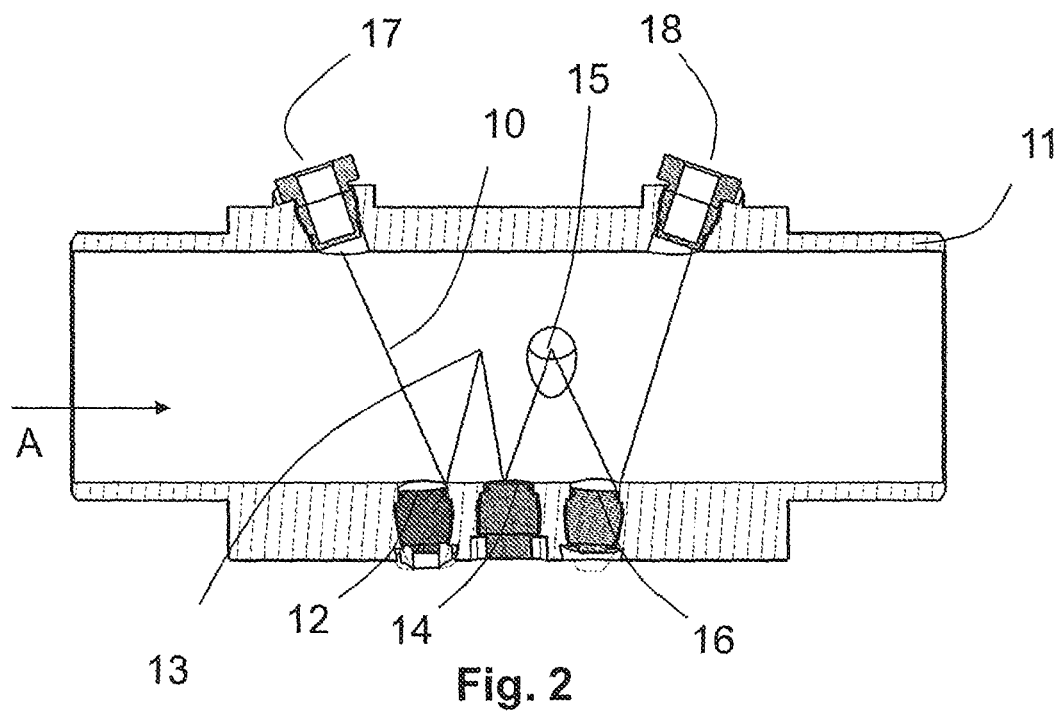
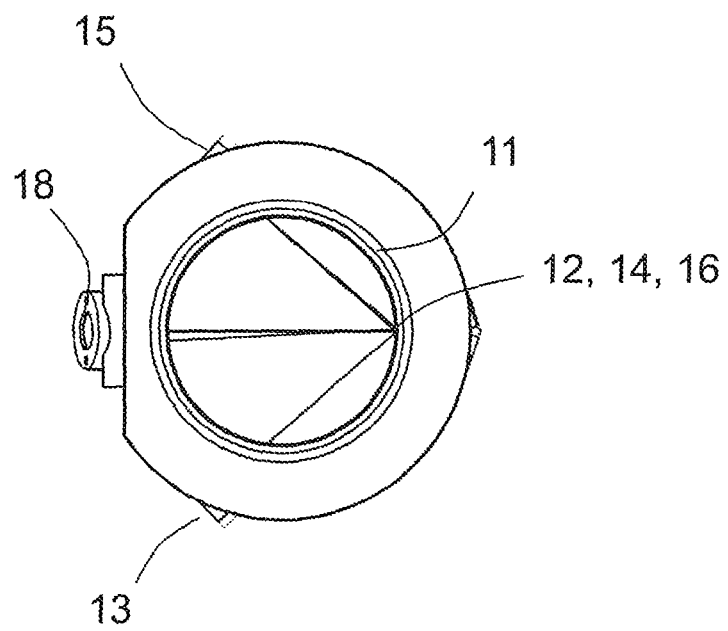

ULTRASONIC FLOW MEASURING DEVICE HAVING A CONCAVE REFLECTIVE SURFACE THAT CANCELS DISPERSION AND METHOD FOR ASCERTAINING FLOW VELOCITY, RESPECTIVELY VOLUME FLOW, OF A FLUID

TECHNICAL FIELD

The invention relates to an ultrasonic flow measuring device for ascertaining flow velocity, respectively volume flow, of a fluid.

BACKGROUND DISCUSSION

U.S. Pat. No. 7,360,447 B2 discloses an ultrasonic flow measuring device, in the case of which an acoustic signal is reflected by concave reflectors. There, the acoustic signals are transmitted parallel to the flow direction of the fluid.

An ultrasonic flow measuring device working according to the travel time difference principle is known per se and is described, for example, in German Patent DE 10 2011 079 250 A1 (US 2014144247). Such discloses an ultrasonic flow measuring device having a transmitter and a receiver, which are arranged in or on a measuring tube. The transmitter transmits an acoustic signal, which is reflected on one or more reflection surfaces and then strikes a receiver. This ultrasonic flow measuring device has basically done well. In the case of higher flow velocities, however, a lessening of the signal intensity is observed, since the acoustic signal is dispersed by the high flow velocity of the fluid and then is only partially registered by the sensor.

SUMMARY OF THE INVENTION

It is, consequently, an object of the present invention to provide an ultrasonic measuring device having velocity compensated beam guidance, as well as a method, which counteracts dispersion related, signal weakening.

This object is achieved by an ultrasonic flow measuring device.

The ultrasonic flow measuring device of the invention for ascertaining flow velocity, respectively volume flow, of a fluid, especially a gas or a liquid, using a travel-time difference method includes: a measuring tube having a straight measuring tube axis; at least a first transducer for transmitting an acoustic signal; at least a second transducer for receiving the acoustic signal; and at least one reflection surface for reflecting the acoustic signal; wherein the first transducer and the second transducer are arranged on the tube wall of the measuring tube in such a manner that they transmit, respectively receive, the acoustic signal inclined or perpendicularly to the flow direction (A) of the fluid; wherein the acoustic signal travels between the first transducer and the second transducer along a signal path, which includes a reflection on the at least one reflection surface, wherein, according to the invention, the at least one reflection surface is embodied concavely in at least one preferential direction in the measuring tube.

The preferential direction can especially comprise the axial direction, thus the longitudinal direction, of the measuring tube.

The acoustic signal is preferably an ultrasonic signal.

Due to the concave formation of the reflection surface in the direction of the measurement axis, acoustic signals, which otherwise would strike the flat reflection surface of the inner wall of the measuring tube, are deflected. In this way, dispersion of an acoustic signal in or against the flow direction of the fluid can be cancelled and, thus, a velocity compensation of the beam guidance achieved.

Advantageous embodiments of the invention are subject matter of the dependent claims.

The reflection surface is preferably embodied as a concave mirror.

It is especially advantageous when a plurality of reflection surfaces are arranged in the measuring tube for multiple reflection of the acoustic signal, such that, for example, an average flow velocity is more exactly determinable. As the number of reflections in the measuring tube rises, however, so too does the measuring distance, respectively the length of the signal path, and therewith the extent of the dispersion. Therefore, it is especially advantageous when a corresponding velocity compensation occurs by way of a concave reflection surface, especially in the case of multiple reflection, at each reflection point in the measuring tube.

For better servicing and also for easier accessibility in the case of defect, it is advantageous when the reflection surface is embodied in the form of a component, which is releasably installed in the measuring tube.

In another embodiment of the invention, at least one concavely embodied reflection surface is embodied as a component, which is joined with the measuring tube, wherein the joining comprises especially welding, soldering, brazing or adhering.

In an additional embodiment of the invention, at least one concavely embodied reflection surface is formed as one piece with the measuring tube.

According to a further development of the invention, the ultrasonic flow measuring device enables in advantageous manner especially also the registering of acoustic signals at a ratio $(v_F/c)$ of a flow velocity $v_F$ of the fluid to a velocity c of the acoustic signal in the fluid of greater than 0.1%. Such a ratio arises especially in the case of gases or very rapidly flowing liquids. For fluids flowing fast in such a manner, the described ultrasonic measuring device can be used advantageously without experiencing significant weakening of the acoustic signal.

Additionally for velocity compensation according to a further development of the invention, the acoustic signals are focusable by the concave reflection surface. In this way, the signal intensity detected by the receiver can be advantageously improved.

In a further development of the invention, the first transducer and the second transducer are each embodied as ultrasonic transducers for producing and for receiving acoustic signals.

In a further development of the invention, the ultrasonic flow measuring device includes a plurality of reflection surfaces of concave contour, wherein a first radius of curvature in the center of a first reflection surface in a first reflection plane of a reflection of an idealized signal path at the first reflection surface deviates from a second radius of curvature in the center of a second reflection surface in a second reflection plane of a reflection of the idealized signal path at the second reflection surface, wherein the idealized signal path extends, in each case, as a straight line between the centers of transmitting, respectively receiving, surfaces of the ultrasonic transducers and the centers of the reflection surfaces.

In a further development of the invention, at least one reflection surface has a concave, parabolic contour.

In a further development of the invention, a first radius of curvature in the center of at least a first reflection surface in a first reflection plane of an idealized signal path of a reflection on the first reflection surface deviates from a second radius of curvature in the center of the first reflection surface in a second plane, which extends perpendicularly to the first reflection plane and in which the surface normal of the first reflection surface lies in the center of the first reflection surface.

In a further development of the invention, at least two reflection surfaces have surface dimensions deviating from one another.

In a further development of the invention, at least one reflection surface has in a preferential direction a greater extent than in other directions.

In a further development of the invention, at least one reflection surface is more strongly developed in the direction of the flow. This means, especially, that the separation of the at least one reflection surface from the tube central axis decreases in the flow direction.

According to the invention, a method for ascertaining flow velocity of a fluid, especially a gas or a liquid, using the travel time difference measuring method by means of ultrasonic flow measurement in a measuring tube having a straight measuring tube axis comprises steps as follows:
   a) transmitting at least one acoustic signal inclined or perpendicularly to the flow direction of the fluid;
   b) reflecting the acoustic signal on one or more concave reflection surfaces and
   c) receiving and evaluating the acoustic signal for ascertaining flow velocity of the fluid.

Reflection on one or more concave reflection surfaces essentially compensates the signal weakening caused by dispersion of the signal. This can occur, on the one hand, from change of the angle of reflection and, on the other hand, from focusing of the acoustic signal.

BRIEF DESCRIPTION OF THE DRAWINGS

The invention will now be explained in greater detail based on the drawing, the figures of which show as follows:

FIG. 2 is a sectional side view of a signal path in the case of multiple reflection in a measuring tube of an ultrasonic flow measuring device of the invention;

FIG. 3 is an end view of a signal path in the case of multiple reflection in a measuring tube of an ultrasonic flow measuring device of the invention;

DETAILED DISCUSSION IN CONJUNCTION WITH THE DRAWINGS

Basic features of travel time difference measuring methods for determining flow velocities of a fluid are well known. According to the travel-time difference principle, the different travel times of ultrasonic pulses are evaluated relative to the flow direction of the fluid. In such case, the propagation velocity of acoustic signals, especially of ultrasonic waves, in a medium is directly influenced by the flow velocity of the medium. According to the travel-time difference principle, ultrasonic pulses are transmitted both in, as well as also counter to, the flow direction. Based on the travel-time difference, the flow velocity and therewith, in the case of known diameter of the pipeline section, the volume flow can be determined.

Figure 4:
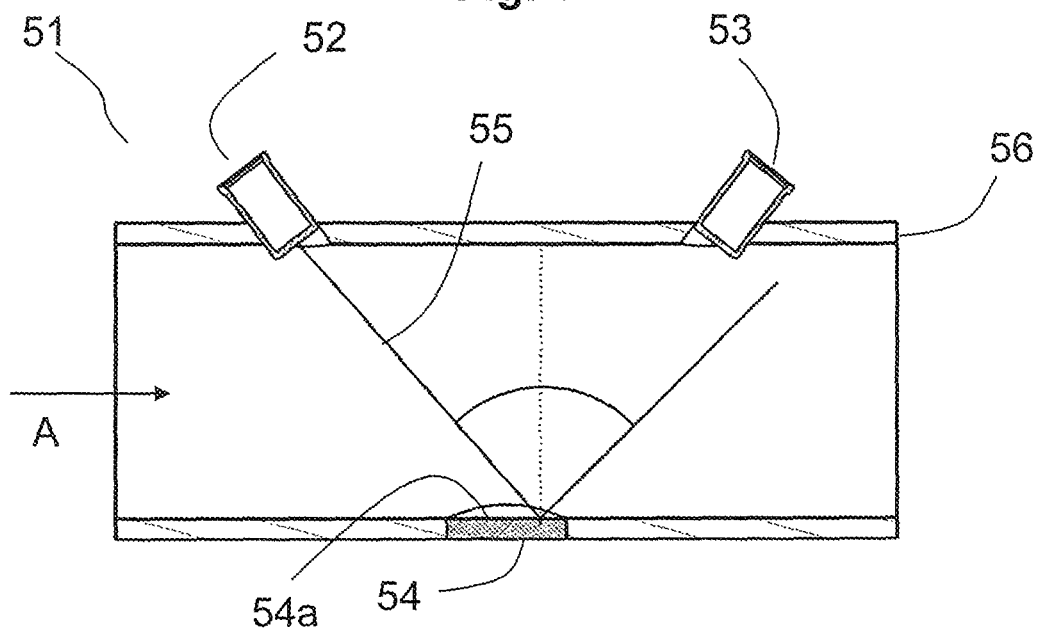
FIG. 4 is a sectional side view of a schematic representation of an ultrasonic flow measuring device in the case of a single reflection according to the state of the art.
Figure 5A:
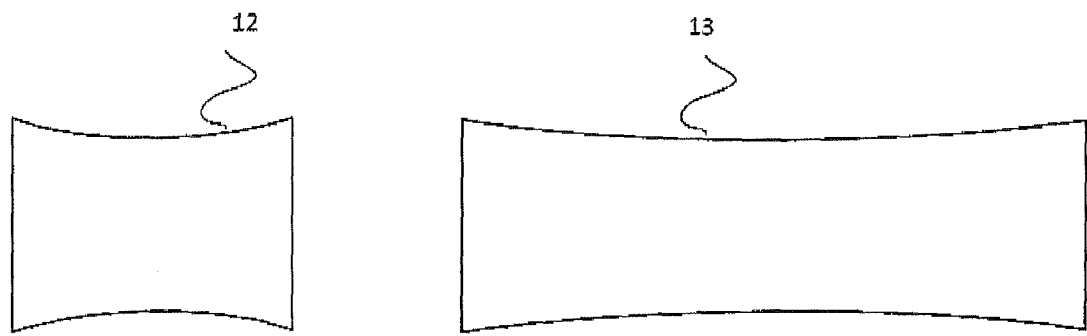
FIG. 5a is an end view of two different reflection surfaces with different surface dimensions.
Figure 5B:
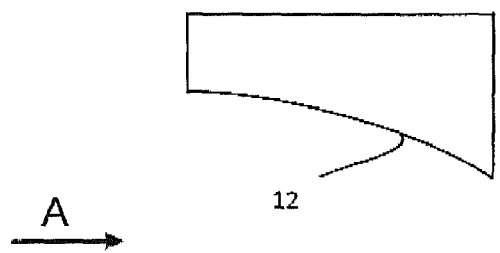
FIG. 5b is a side view of a reflection surface with respect to the flow direction A of the fluid.

FIG. 4 shows schematically ultrasonic flow measuring device 51 according to the state of the art and a therein resulting deflection of an acoustic signal 55, which should travel from a first transducer 52 to a second transducer 53. The shown deflection of the axis of the signal path arises in the case of travel through a fluid, which is flowing, for example, in a measuring tube 56 having an inner diameter of, for instance, 52 mm with a flow velocity of, for instance, 150 m/s in the flow direction A. The velocity of sound in this medium amounts to 1500 m/s. As one can see based on FIG. 4, there arises in the case of reflection on a planar reflection surface 54 of a reflection apparatus a dispersion of the acoustic signal 55, which leads to a significant, undesired weakening of the signal reaching the second transducer 53.

Figure 1:
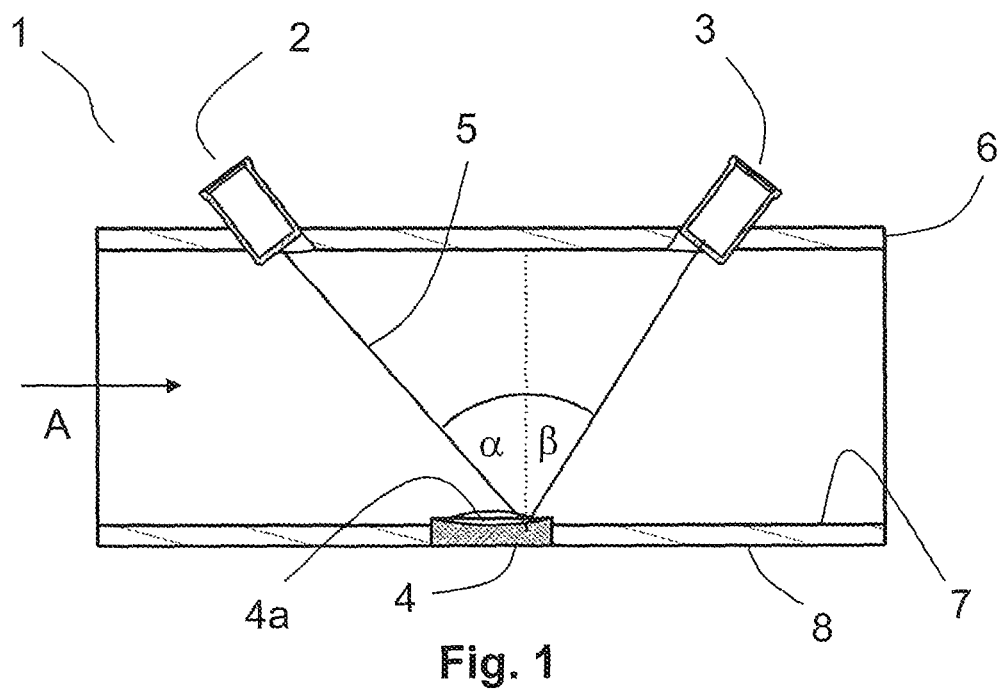
FIG. 1 is a sectional, side view of a schematic representation of an ultrasonic flow measuring device of the invention in the case of a single reflection.

FIG. 1 shows—here only schematically—the construction of a first variant of an ultrasonic measuring device 1 of the invention.

This ultrasonic measuring device includes a measuring tube 6. Measuring tube 6 has an outer wall surface 8 and an inner wall surface 7. Mounted on measuring tube 6 is a first transducer in the form of an ultrasonic transducer for producing an acoustic signal 5 and a second transducer 3, likewise embodied as an ultrasonic transducer, and serving for detection of the acoustic signal 5.

Acoustic signal 5 is transmitted in FIG. 1 in the flow direction A.

The second transducer 3 can likewise transmit an acoustic signal, in such case counter to the flow direction A of the fluid, which signal can be detected by the first transducer 2. From the travel-time difference between the two signals, the flow velocity of the fluid, respectively its volume flow, can be ascertained.

Measuring tube 6 additionally includes a reflector arrangement 4 having a reflection surface 4a, which is here embodied in the form of a concave mirror. Such concave mirror enables a correction of the dispersion of the acoustic signal in such a manner that the angle of incidence α of the acoustic signal 5 has, with reference to a plane perpendicular to the longitudinal axis of the tube, a magnitude different from the angle of reflection β of the acoustic signal 5 after its reflection on the reflection surface 4a.

This type of reflection surface 4a cancels dispersion of the acoustic signal 5 in the flow direction A. Dispersion of the acoustic signal 5 can occur both in the flow direction A and counter to the flow direction A. Independently of the flow direction A, reflection surface 4a enables a complete, or at least partial, compensation of the said dispersion.

In the case of the uniformly concavely formed, concave mirror illustrated here, the optical, respectively acoustic, axis is located advantageously at the point where the acoustic signal 5 would strike, if there were no deflection of the acoustic signal 5 along the signal path, respectively in the case in which the fluid located in the measuring tube 6 would be at rest.

The reflector arrangement 4 with the reflection surface 4a, or surfaces, can especially be installed as a component on or in the inner wall surface 7 of the measuring tube 6. Thus, such components 4 can, for example, be installed releasably in the measuring tube 6 by shape interlocking by means of screw or bayonet connections or solidly joined with the measuring tube 6, for example, by soldering, brazing or welding.

The acoustic signal 5 can be transmitted inclined or perpendicularly to the flow direction A of the fluid in the measuring tube 6.

FIGS. 2 and 3 show a signal path of an acoustic signal 10 in the case of multiple reflection thereof in a measuring tube 11 of a second example of an embodiment of a flow measuring device of the invention. In such case, in the here illustrated variant of the invention, the acoustic signal is transmitted by a first ultrasonic transducer 17, reflected on each reflection surface 12-16 of a reflector arrangement having a plurality of reflection surfaces 12-16 and then detected by a second ultrasonic transducer 18.

Due to the concave curvature of the reflection surfaces 12-16, the deflection, respectively dispersion, of the acoustic signal 10 along the respective signal path, i.e. deflection, respectively dispersion, brought about by the flow of the fluid, is cancelled.

The multiple reflection shown in FIGS. 2 and 3 advantageously improves the accuracy of measurement for ascertaining the average flow velocity of the fluid.

LIST OF REFERENCE CHARACTERS 1 ultrasonic flow measuring device
2 first transducer (transmitter)
3 second transducer (receiver)
4 reflector arrangement
4a reflection surface
5 acoustic signal
6 measuring tube
7 inner wall surface
8 outer wall surface
10 acoustic signal
11 measuring tube
12 reflection surface
13 reflection surface
14 reflection surface
15 reflection surface
16 reflection surface
17 first transducer (transmitter)
18 second transducer (receiver)
A flow direction
α angle of incidence
β angle of reflection

The invention claimed is:

1. An ultrasonic flow measuring device for ascertaining flow velocity, respectively volume flow, of a fluid, using a travel-time difference method, comprising:
a measuring tube having a straight measuring tube axis;
at least a first transducer for transmitting an acoustic signal;
at least a second transducer for receiving the acoustic signal; and
at least one reflection surface for reflecting the acoustic signal, wherein:
said first transducer and said second transducer are arranged on the tube wall of said measuring tube in such a manner that they transmit, respectively receive, the acoustic signal inclined or perpendicularly to the flow direction of the fluid;
the acoustic signal travels between said first transducer and said second transducer along a signal path, which includes a reflection on the at least one reflection surface; and
in that the at least one reflection surface is embodied concavely in at least one preferential direction in the measuring tube; wherein
at least one concavely embodied reflection surface is embodied as a component, which is releasably installed in said measuring tube.

2. The ultrasonic flow measuring device as claimed in claim 1, wherein:
said at least one reflection surface is embodied as a concave mirror.

3. The ultrasonic flow measuring device as claimed in claim 1, wherein:
a plurality of reflection surfaces are arranged in said measuring tube for multiple reflection of the acoustic signal; and
at least one reflection surface is embodied concavely.

4. The ultrasonic flow measuring device as claimed in claim 3, wherein:
all reflection surfaces are embodied concavely.

5. The ultrasonic flow measuring device as claimed in claim 3, wherein:
acoustic signals are focusable by the concave reflection surfaces for increasing signal intensity.

6. The ultrasonic flow measuring device as claimed in claim 1, wherein:
the device enables registering of acoustic signals at a ratio $(v_F/c)$ of a flow velocity $v_F$ of the fluid to a velocity c of the acoustic signal in the fluid of greater than 0.1%.

7. The ultrasonic flow measuring device as claimed in claim 1, wherein:
the device enables registering of acoustic signals at a ratio $(v_F/c)$ of a flow velocity $v_F$ of the fluid to a velocity c of the acoustic signal in the fluid of greater than 1% with weakening of the signal of less than 20%.

8. The ultrasonic flow measuring device as claimed in claim 1, wherein:
said first transducer and said second transducer are each embodied as ultrasonic transducers for producing and for receiving acoustic signals.

9. The ultrasonic flow measuring device as claimed in claim 1, wherein:
the device includes a plurality of reflection surfaces of concave contour, a first radius of curvature in the center of a first reflection surface in a first reflection plane of a reflection of an idealized signal path at the first reflection surface deviates from a second radius of curvature in the center of a second reflection surface in a second reflection plane of a reflection of the idealized signal path at the second reflection surface; and
the idealized signal path extends, in each case, as a straight line between the centers of transmitting, respectively receiving, surfaces of the ultrasonic transducers and the centers of the reflection surfaces.

10. The ultrasonic flow measuring device as claimed in claim 1, wherein:
at least one reflection surface has a concave, parabolic contour.

11. The ultrasonic flow measuring device as claimed in claim 1, wherein:
a first radius of curvature in the center of a first reflection surface in a first reflection plane of an idealized signal path of a reflection on the first reflection surface deviates from a second radius of curvature in the center of the first reflection surface in a second plane, which extends perpendicularly to the first reflection plane and in which the surface normal of the first reflection surface lies in the center of the first reflection surface.

12. The ultrasonic flow measuring device as claimed in claim 1, wherein:
the ultrasonic flow measuring device has at least two reflection surfaces, and at least two reflection surfaces have surface dimensions deviating from one another.

13. The ultrasonic flow measuring device as claimed in claim 1, wherein:
at least one reflection surface has in a preferential direction a greater extent than in other directions.

14. The ultrasonic flow measuring device as claimed in claim 1, wherein:
the at least one reflection surface is more strongly developed in the direction of the flow, such that the separation of the reflection surfaces from the tube central axis decreases with the flow direction.

15. A method for ascertaining flow velocity, respectively volume flow, of a fluid using the travel time difference measuring method, by means of an ultrasonic flow measuring device as claimed in claim 1 by means of ultrasonic flow measurement in a measuring tube having a straight measuring tube axis, comprising the steps as follows: transmitting at least one acoustic signal inclined or perpendicularly to the flow direction (A) of the fluid; reflecting the acoustic signal on one or more concave reflection surfaces; and receiving and evaluating the acoustic signal for ascertaining flow velocity of the fluid.

16. The method as claimed in claim 15, wherein:
through reflecting the acoustic signal on one or more concave reflection surfaces, a deflection of the acoustic signal occurs in such a manner that, with reference to the inner wall surface of the measuring tube, the angle of incidence $\alpha$ of the acoustic signal before the reflection and the angle of reflection $\beta$ of the acoustic signal after the reflection are different from one another.

17. The method as claimed in claim 15, wherein:
through reflecting the acoustic signal on one or more concave reflection surfaces, a focusing of the acoustic signal occurs.

* * * * *